United States Patent [19]
Thaler et al.

[11] 3,756,246
[45] Sept. 4, 1973

[54] APPARATUS FOR EXTERNALLY DETERMINING ACTUAL OUTPUT OF AN IMPLANTED ENERGY SOURCE

[75] Inventors: Sherwood S. Thaler, Lexington; Richard F. Daynard, Chelmsford, both of Mass.

[73] Assignee: American Optical Corporation, Southbridge, Mass.

[22] Filed: July 15, 1971

[21] Appl. No.: 162,834

[52] U.S. Cl. .... 128/419 R, 128/2.05 R, 128/2.06 R, 128/419 P
[51] Int. Cl. .............................................. A61b 5/05
[58] Field of Search .................. 128/2.05 R, 2.05 T, 128/2.06 R, 419 B, 419 C, 419 E, 419 P, 419 R, 421, 422, 423

[56] References Cited
UNITED STATES PATENTS 3,517,663  6/1970  Bowers et al. ................. 128/2.06 R
3,426,748  2/1969  Bowers ........................... 128/2.06 R

*Primary Examiner*—William E. Kamm
*Attorney*—William C. Nealon, Joel Wall et al.

[57] ABSTRACT

Apparatus for externally determining actual output of an implanted energy source used for powering an electronic device implanted within a patient. The apparatus includes test circuitry and an externally operated control for engaging the test circuitry with the device. Variations in output of the device when operated in a testmode versus a normal operating mode are externally measured and are used to calculate or measure output of the energy source. A typical device which can be used with the present invention is an implantable pacer which is described in an illustrative embodiment of the invention.

7 Claims, 1 Drawing Figure

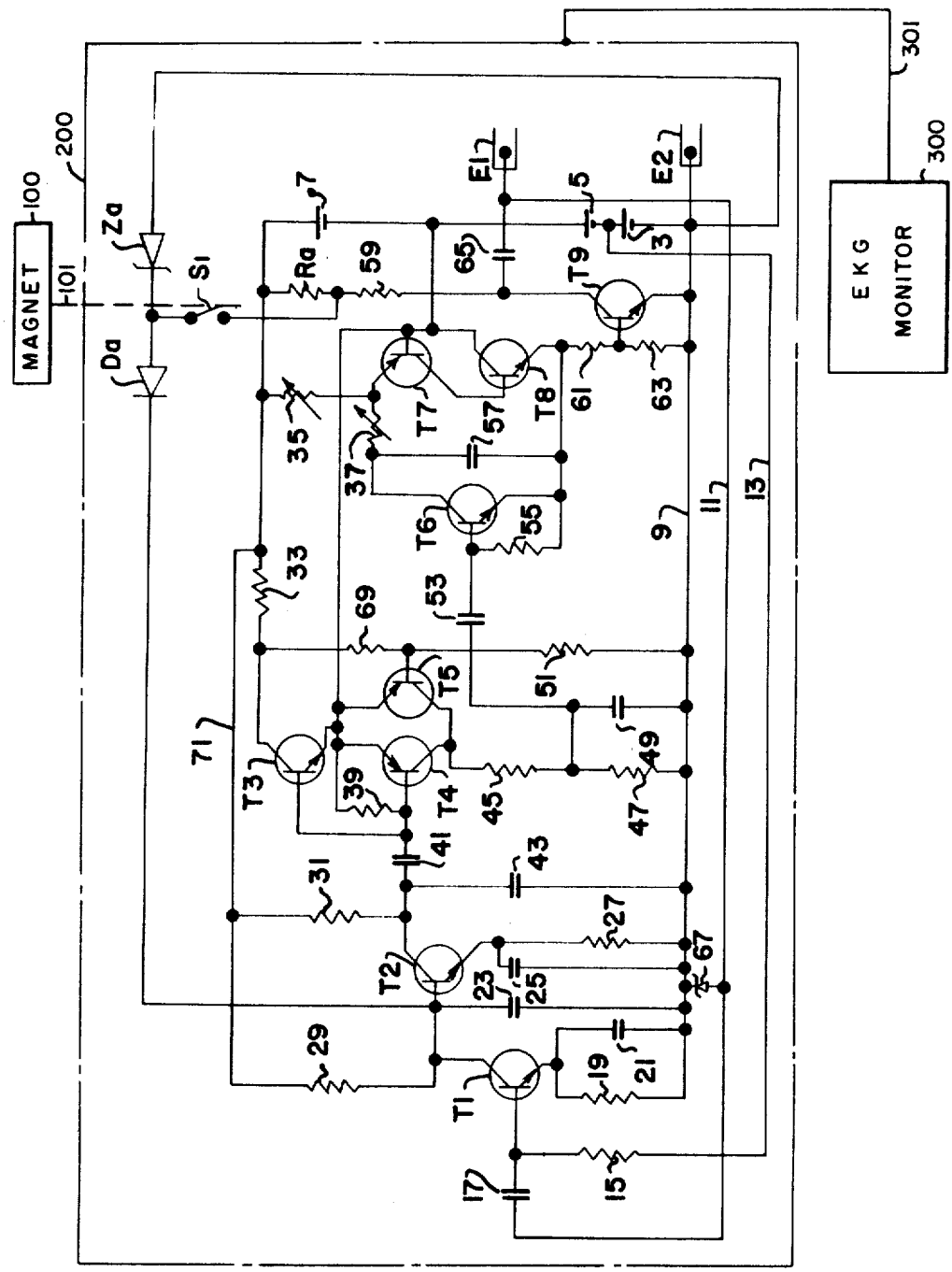

APPARATUS FOR EXTERNALLY DETERMINING ACTUAL OUTPUT OF AN IMPLANTED ENERGY SOURCE

BACKGROUND OF THE INVENTION

The invention relates to implantable medical-electronics devices and more particularly relates to a device for externally measuring and calibrating an implanted battery supply capable of being used with an implanted pacer.

2. Description of the Prior Art

Typical prior art includes U.S. Pat. No. 3,528,428 to Berkovits, filed on April 11, 1968 wherein a reed switch can be externally operated by a magnet. In another U.S. Pat. No. 3,311,111 to Bowers, filed on Aug. 11, 1964, internal reed switches activated by external magnets for the purpose of varying time constants are disclosed.

In the various areas of medical electronics where apparatus may be implanted within the human body, problems may arise when an inspection of certain parts of the apparatus should be made. Ordinarily, a surgical procedure is involved in implantation of most medical electronic devices, and likewise a surgical procedure is involved when removing these devices for inspection.

One of the medical electronic devices implanted within the human body during the past few years is a pacer, or heart-stimulating device. Typically, these pacers are battery operated, and the batteries are usually implanted with the electronics of the pacer. Normally, battery depletion is a major concern, and because of battery depletion and other reasons, the pacer is eventually removed and replaced with a new one. It may thus be apparent that one of the ways to check remaining battery life is to utilize a surgical procedure to remove the implanted pacer with its batteries and externally check them with a voltmeter. This is cumbersome, inefficient and unsatisfactory from almost all points of view. The present patent application provides a solution to this and other problems.

SUMMARY OF THE INVENTION

The invention of the present application relates to circuitry which in a particular embodiment comprises a reed switch, a zener diode, a diode, a resistor, and an external magnet. As an illustrative example, this circuitry is operatively depicted in conjunction with other circuitry of a pacer. The present invention can be compatible with all types of pacers including demand, continuous, bifocal, etc. The reed switch can be externally magnetically operated.

The circuitry is so arranged that a precise zener voltage is controllably utilized as "supply voltage" for part of the pacer circuitry. A heartbeat-stimulating capacitor charges toward the zener voltage, a voltage less than total battery voltage. A simple oscilloscope measurement of the pulse height is made when the pacer is "supplied" by the zener diode. Also, stimulation pulse height is measured under ordinary conditions, when the heartbeat stimulating capacitor is being supplied from total battery voltage. This information, along with knowledge of the zener breakdown voltage is sufficient for one to precisely calculate the battery voltage at that time and under those conditions.

Placement of a magnet external the implanted apparatus to operate the reed switch, provides conversion from demand pacer operation to continuous pacer operation simultaneously with providing information for calibration of supply voltage. In the illustrative embodiment, battery calibration thus occurs with continuous pacing to provide a continuous supply of stimulation pulses. However, this need not necessarily be the case, and separate reed switches for each function could be employed.

Thus, one can measure voltage of an implanted battery which could be used as a supply for an implanted pacer. These measurements can be made without any surgical procedure.

A saliant advantage of this method of measurement is that one can accurately determine actual battery voltage after implantation with the battery and circuitry being used in a realistic environment. Measurement of battery voltage under these conditions takes into account resistance of the electrodes or terminals and any stray leakages or capacitance which may not exist in the laboratory.

Thus, it is an object of the invention to provide improved implantable pacer apparatus.

It is another object of the invention to provide an improved apparatus and method for determining actual voltage of an implanted battery.

Other objects and advantages of the present invention will become apparent to one having reasonable skill in the art after referring to the detailed description of the appended drawing wherein:

The drawing is a schematic diagram of a demand pacer including an illustrative embodiment of the present invention in operative connection.

DESCRIPTION OF THE PREFERRED EMBODIMENT

The drawing of the present application is very similar to FIG. 1 of U.S. Pat. No. 3,528,428. Material disclosed in that patent is incorporated herein by reference.

The inprovement of the present invention over U.S. Pat. No. 3,528,428 comprises the following changes: (1) switch S of the patent has been deleted, and (2) the following circuitry has been added: Resistor Ra is inserted between the anode of battery 7 and one end of resistor 59 with the other end being connected as before. The junction between resistor Ra and resistor 59 is connected to one end of reed switch S1. The other end of reed switch S1 is connected to a junction of diodes Da and Za. Za is a zener diode whose cathode is connected to the junction of reed switch S1 and the anode of diode Da. The anode of zener diode Za is connected to line 9 which can be considered to be "ground." The cathode of diode Da is connected to the base of transistor T2.

The description of operation of the demand pacer circuitry as disclosed in the drawing of this patent application is substantially that described by U.S. Pat. No. 3,528,428. Of course, deletion of switch S of U.S. Pat. No. 3,528,428 results in the continuous mode of operation not being obtained as described in that patent but is obtained by closure of switch S1. This will be described below.

In operation, an external magnet, which is depicted in the drawing as magnet 100, is brought in proximity to the implanted device. Switch S1 is made to close upon influence of the magnetic field depicted by dashed line 101. On closure of Switch S1, voltage from batteries 3, 5, and 7 cause current to flow through resistor Ra through Switch S1, and through zener diode Za to line 9 and the return of battery 3. The flow of current through zener diode Za is accompanied by the zener breakdown voltage (a voltage less than total voltage of batteries 3, 5, and 7). This voltage can be made as precise as desired by selection of a particular zener diode having a certain breakdown voltage at a certain current level. This breakdown voltage is the voltage towards which capacitor 65 is made to charge after each stimulation pulse. Thus, capacitor 65 does not charge to the same extent as it charged previously when Switch S1 was open. Accordingly, stimulation pulses will have a small amplitude.

Simulataneously with the above described operation as a result of closure of Switch S1, almost the same breakdown voltage (except for the diode voltage drop across Da) is applied to the base of transistor T2. This voltage at the base of transistor T2 causes transistor T2 to saturate and go out of its operating range. As is described in U.S. Pat. No. 3,528,428, transistor T2 is an amplifier used to amplify a portion of the EKG signal of a sensed heartbeat. Upon application of a large voltage at the base of transistor T2, transistor T2 is made to fall outside of its operating range and prevents operation of the pacer detection circuitry. Accordingly, pulses are not fed via capacitor 53 to the base of transistor T6 early enough to prevent capacitor 57 from reaching a threshold level. Capacitor 57 is allowed to charge to that level which turns on transistors T7 and T8 and causes capacitor 65 to discharge via transistor T9, the electrodes and through the heart. Thus, when Switch S1 is made to close in response to the magnetic field of an external magnet, two things occur simultaneously: (1) the amplitude of stimulation pulses is reduced, and (2) the demand pacer operation is negated or inhibited and the pacer operates in a continuous mode to supply pulses repetitively in order to allow easy measurement of pulse amplitude. Pulse amplitude is measured with ordinary EKG equipment, as depicted in the drawing by EKG monitor 300 connected to patient body outline 200 by conductors 301, or on an oscilloscope (not shown).

By application of a simple ratio formula, one can calculate total value of the batteries after implantation, at any time desired. For example, consider the zener diode breakdown voltage to be 4.3 volts and the total battery voltage to be in the neighborhood of 6 volts. Consider the following equation:

$$Vp/Vpz = Vb/Vbz$$

where $Vp$ corresponds to amplitude of the stimulation pulse in ordinary operation, where $Vpz$ corresponds to amplitude of the stimulation pulse when Switch S1 is closed, where $Vb$ corresponds to the voltage of the battery which one is trying to obtain, and where $Vbz$ corresponds to voltage of the zener diode (i.e.: 4.3 volts, a known quantity). From this equation, one can readily calculate and solve for the $Vb$, the unknown battery voltage, after measuring $Vp$ and $Vpz$.

The invention may be embodied in other specific forms without departing from the spirit or essential characteristics thereof. For example, when S1 is closed, the amplifier is disabled by placing a normally high voltage at the base of T2. Other points within the detection circuitry of the pacer could have been utilized. Thus, the circuitry could have been arranged differently, and other components may be used.

Also, the present invention can be used to measure the supply level associated with other (non-pacer) implanted electronic devices which provide electrical outputs that can be externally sensed and which are supply-level dependent. (An example of a non-pacer device could be an implanted free running multivibrator or other oscillator whose amplitude and frequency are supply-level dependent.)

The present embodiments are therefore to be considered in all respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. Implanted apparatus comprising: a D.C. power supply; and means for determining precise actual value of voltage of said supply, said determining means comprising:
   first means connected to said supply for generating pulses with amplitudes proportional to said voltage;
   second means connected to said supply for generating a precise DC voltage less than said voltage;
   said first means including third means responsive to the operation of said second means for generating other pulses with fixed amplitudes proportional to said precise DC voltage;
   fourth means for mutually exclusively inhibiting operation of said first means and said third means; and
   fifth means for measuring a representation of the amplitudes of said pulses and said other pulses.

2. Apparatus as recited in claim 1 and wherein said DC power supply comprises at least one battery.

3. Apparatus as recited in claim 1 and wherein said first means comprises capacitive means for charging towards said voltage and for discharging in a repetitive manner.

4. Apparatus as recited in claim 3 and wherein said third means comprises said capacitive means for charging towards said precise DC voltage and for discharging in a repetitive manner.

5. Apparatus as recited in claim 1 and wherein said second means comprises zener diode circuitry means.

6. Apparatus as recited in claim 1 and wherein said third means comprises capacitive means for charging towards said precise DC voltage and for discharging in a repetitive manner.

7. Apparatus as recited in claim 1 and wherein said fourth means comprises switch means for connecting said first means to said supply during a first switch position, and for connecting said second means to said supply during a second switch position.

* * * * *